April 11, 1967  D. S. DENCE  3,313,379
BRAKE
Filed April 4, 1966

*INVENTOR*
DONALD S. DENCE
BY Robert H. Johnson
ATTORNEY

3,313,379
BRAKE
Donald S. Dence, Jackson, Mich., assignor to Clark Equipment Company, a corporation of Michigan
Filed Apr. 4, 1966, Ser. No. 540,016
1 Claim. (Cl. 188—77)

This invention relates to brakes, and more specifically to parking brakes that are especially suitable for use with industrial vehicles such as forklift trucks and the like.

Many forklift trucks, for example, have a parking brake which includes a drum fixed to the truck drive shaft. Because of the limited space in which the brake can be located, these brakes often are undesirably low in braking capacity. Thus, a principal object of my invention is to provide a small brake with a large braking capacity.

Another object of my invention is to provide a low cost and easily assembled brake.

In carrying out my invention in a preferred embodiment I provide a brake drum with a groove in the outer periphery thereof. A plurality of brake shoes are disposed in the groove in spaced relation from each other. A flexible cable substantially encircles the drum and is disposed in grooves in the outer surface of the shoes. These shoes are prevented from sliding relative to the cable by means of restraining members fixed to the cable and which are disposed in enlarged portions of the grooves in the shoes.

Figure 2:
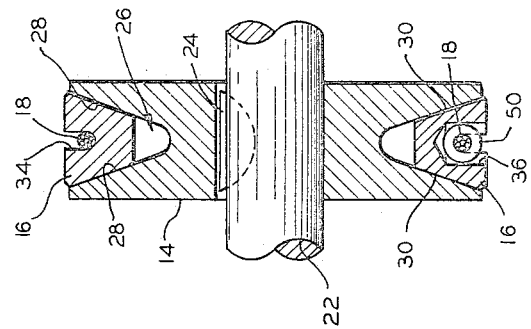
Figure 1:
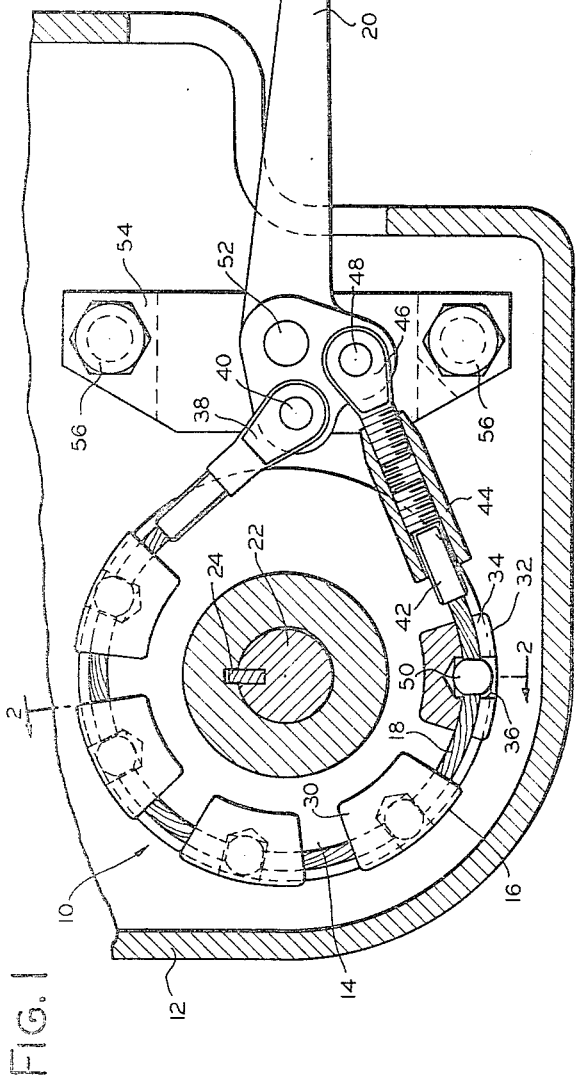
Figure 3:
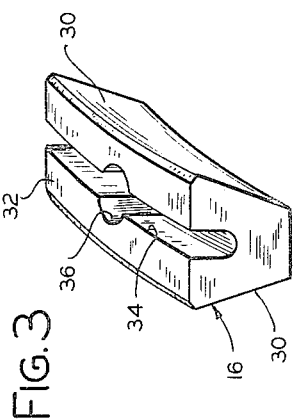

The above and other objects, features and advantages of my invention will become more readily apparent to persons skilled in the art when the following detailed description is taken in conjunction with the accompanying drawing wherein:

FIGURE 1 shows my novel brake with a portion of the drum removed in order to show better the brake shoes, cable and restraining members, FIGURE 2 is a cross section along line 2—2 of the brake shown in FIG. 1, and FIGURE 3 is a perspective view of one of the brake shoes.

Referring now to the drawing, the reference numeral 10 denotes generally my improved brake which is disposed within a housing member 12 which may be part of a forklift truck, for example.

Brake 10 includes a drum 14, a plurality of brake shoes 16, a flexible cable 18 and an actuating lever 20.

Drum 14 is carried by the vehicle drive shaft 22 and is fixed thereto for conjoint rotation by means of a key 24. Drum 14 includes a groove 26 in the outer periphery thereof. Groove 26 has a pair of converging or inwardly tapering walls 28 which cooperate with shoes 16, as will be explained hereinafter.

Brake shoes 16 are made of suitable friction brake material and are arcuate as viewed in FIG. 1, being, in fact, portions of an annular ring. Each shoe 16 includes a pair of inwardly tapering or converging sides 30 which have the same slope as walls 28. Also, in the outer surface 32 of each shoe 16 is a longitudinally extending groove 34 with an enlarged portion 36 located intermediate the ends of groove 34. Enlarged portion 36 is shown as cylindrical, but could be rectangular or some other shape as well.

Substantially encircling drum 14 is cable 18 which preferably is made of woven or twisted steel strands and while flexible tends to straighten itself. One end of cable 18 has an eye 38 connected to it. Eye 38, in turn, is connected to actuating lever 20 by means of a pin 40. The other end of cable 18 has a threaded member 42 attached to it. An internally threaded sleeve 44 engages threaded member 42 and an eye 46 threadably engages sleeve 44. The threads of member 42 and eye 46 are opposite so that rotation of sleeve 44 effectively lengthens or shortens the distance from the one end of cable 18 to eye 46, whereby an adjustment for the initial location of actuating lever 20 is provided. Eye 46 is pivotally connected to lever 20 by means of a pin 48. Cable 18 passes through a plurality of spheres 50 which are spaced apart from each other and held in place by swaging or any other suitable fastening operation.

At this point it will be seen that cable 18 is disposed in grooves 34 of shoes 16 and the spheres 50 are disposed in the enlarged portions 36 of grooves 34. As a result cable 18 holds shoes 16 in groove 26 and spheres or retaining members 50 prevent movement of shoes 16 along cable 18.

Actuating lever 20 is mounted on a pin 52 for pivotal movement, pin 52 being attached to a bracket 54 which in turn is fastened to housing 12 by any suitable means such as machine screws 56.

When it is desired to apply brake 10 actuating lever 20 is pivoted in a counterclockwise direction, as viewed in FIG. 1, about pin 52 with the result that cable 18 is tightened around drum 14, whereby sides 30 of shoes 16 are forcefully brought into frictional engagement with walls 28 of groove 26. Consequently, any rotation of drum 14, and hence shaft 22 is either retarded or prevented, depending upon the amount of tension applied to cable 18 by actuating lever 20.

The above-detailed description is intended to be illustrative only, and while only a single preferred embodiment of my invention is shown, it will be understood that it will be obvious to other persons skilled in the art to make various modifications and changes which are within the scope of my invention. For example, cylindrical members rather than spheres 50 could be attached to cable 18. Consequently, the limits of my invention should be determined from the following appended claim.

I claim:

A friction device comprising a drum, a groove in the outer periphery of the said drum, the said groove having a pair of converging walls, a plurality of shoes disposed in the said groove, each shoe having an outer surface and a pair of converging sides engageable with the said walls, a groove in the outer surface of each shoe, each shoe groove including an enlarged portion, a bracket, a lever pivotally connected to the said bracket, a flexible cable substantially encircling the said drum and disposed in the said shoe grooves, the said cable having a pair of ends connected in spaced apart relation to the said lever so that pivotal movement of the said lever in one direction tightens the said cable around the said drum, and a plurality of retaining members fixed to the said cable in spaced apart relation to each other, each retaining member being disposed in one of the said enlarged portions.

References Cited by the Examiner

UNITED STATES PATENTS

| 1,806,957 | 12/1905 | Curry | 188—77 |
| 1,919,998 | 7/1933 | Blume | 188—250 |
| 3,025,647 | 3/1962 | Moody | 74—108 X |

FOREIGN PATENTS

| 17,757 | 9/1898 | Switzerland. |

MILTON BUCHLER, *Primary Examiner.*

B. S. MOWRY, T. W. BUCKMAN, *Assistant Examiners.*